UNITED STATES PATENT OFFICE.

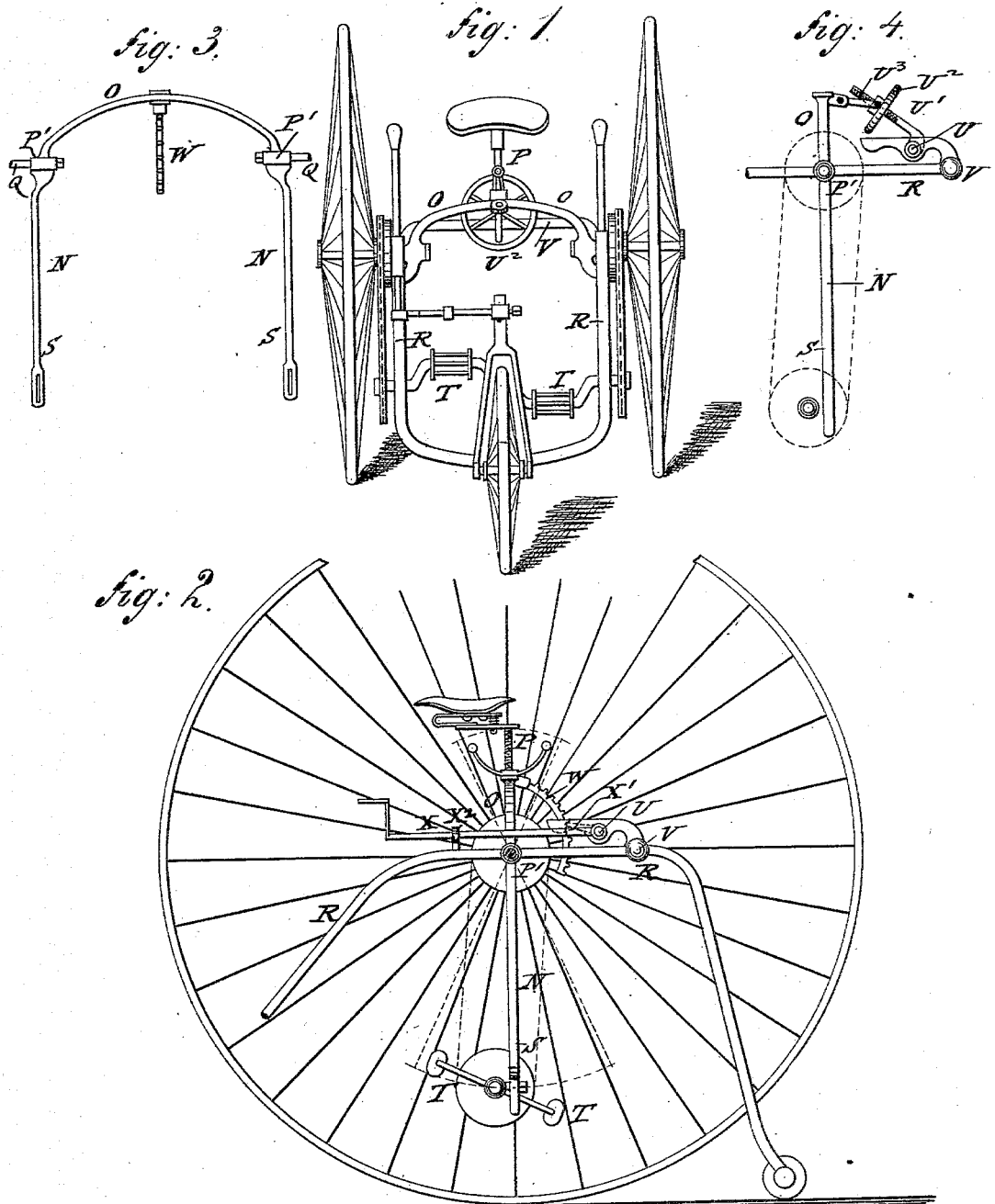

FREDERICK WARNER JONES, OF EXETER, COUNTY OF DEVON, ENGLAND.

VELOCIPEDE.

SPECIFICATION forming part of Letters Patent No. 296,837, dated April 15, 1884.

Application filed February 15, 1884. (No model.) Patented in England October 28, 1881, No. 4,722.

*To all whom it may concern:*

Be it known that I, FREDERICK WARNER JONES, of Exeter, county of Devon, England, velocipede-manufacturer, have invented certain new and useful Improvements in Tricycles and like Velocipedes, (for which I have obtained Letters Patent in Great Britain bearing date October 28, 1881, No. 4,722,) of which the following is a specification.

This invention has for its object improvements in tricyles and like velocipedes, and relates to the construction of the same in such a manner that the pedals and seat-frame are not directly connected to the main frame carrying the wheels, but are supported in a swinging frame pivoted within or to the main frame in such a manner that the rider's center of gravity may be adjusted at will. For instance, in ascending an incline, the pedals may be retracted and the seat brought forward and held by the means hereinafter described, or by other suitable devices; or for descending a hill the rider may advance his pedals and retract his seat, so as to lean well back and obviate the danger of tipping forward.

The invention consists of the main frame, a transverse swing-frame pivoted to the main frame, said swing-frame carrying a seat or saddle, the pedals and the transmitting or driving gear, and of means whereby the swing-frame is retained in the desired position relatively to the main frame, as will more fully appear hereinafter.

In the accompanying drawings, Figure 1 represents a perspective view of my improved tricycle. Fig. 2 is a side elevation of the tricycle, a portion being removed to show the swing-frame. Fig. 3 is a detail front view of the swing-frame detached; and Fig. 4 is a side view of the swing-frame, showing a modified construction of the mechanism for retaining the same in position.

Similar letters of reference indicate corresponding parts.

N in the drawings represents the swing-frame, which is formed in one piece, and which extends transversely across the main frame R between the axles of the driving-wheels. The swing-frame N is provided with an arched transverse portion, O, which has a central socket for the saddle or seat-rod P. At the ends of the arched portion O are arranged sleeves or bearings P', that receive the pins or fulcra Q, carried by the main frame R of the tricyle or other velocipede. Below the sleeves or bearings P' are arranged the vertical arms S, which carry the pedals T at their lower slotted ends. The forward or backward position to which the swing-frame may be shifted is indicated by dotted lines in Fig. 2. A lever, X, is pivoted to a fulcrum, U, carried by the lateral tie rod or beam, V, of the main frame R, said lever being provided with a fixed pawl, X', that engages a fixed segmental rack, W, which extends backward from the arched part O of the swing-frame. The pawl X' of the lever X may lock into any required notch of the segmental rack W, according to the forward or backward position of the rider. Should the rider desire to change the center of gravity, he releases the lever X from a retaining-hook, X², of the main frame R, and raises the lever X, thus lifting its pawl X' clear of the rack W. The swing-frame can then be swung backward or forward by the rider inclining his body, as desired, and can be retained in the required position by lowering the lever X and letting the pawl X' of the lever X drop into one of the notches of the rack W.

In place of the lever and pawl engaging the rack W, the mechanism shown in Fig. 4 may be used, which consists of a pivoted screw-rod, U', and a hand-wheel, U², having a nut turning on said screw-rod, the nut being connected by a pivot-rod, U³, with the upper arched portion, O, of the swing-frame N, whereby the swing-frame may be adjusted forward or backward by simply turning the hand-wheel with the hand, and adjusting thereby the swing-frame N to the proper position required for ascending or descending a hill.

In place of the mechanisms described for setting the swing-frame, any other means for moving and retaining the swing-frame in position may be exployed.

The swing-frame N is adapted to be used with front and rear steering tricycles, also with "quadricycles" and "sociables."

I am aware of the British patent granted to Edouard Carl Friedrich Otto, No. 2,164, May 31, 1879, in which the supporting-frame of a parallel-wheeled bicycle is pivoted to a backbone carrying a caster-wheel to form a tricycle, and in which the seat is supported on the frame and oscillated so as to maintain the rider's balance; but this arrangement is not applicable to ordinary tricycles, and no means are provided for retaining the seat in position.

My transverse swing-frame is entirely within the main frame of the velocipede proper, is very strong, easily adjusted, and not liable to get out of order.

Having thus described my invention, I claim as new and desire to secure by Letters Patent—

1. In a velocipede of the tricycle or like class, a transverse swing-frame pivoted to the main frame and carrying the seat or saddle, the pedals, and the transmitting or driving mechanism, substantially as set forth.

2. In a velocipede of the tricycle or like class, a transverse swing-frame, the upper arched portion of which has a socket for the seat or saddle-bar, horizontal bearings, and vertical rods extending downwardly below said bearings, substantially as set forth.

3. The combination, with the main frame of a tricycle or other like velocipede, of a transverse swing-frame carrying the seat, pedals, and driving-gear, and means, substantially as described, whereby the swing-frame is retained in the desired position relatively to the main frame, substantially as set forth.

In testimony that I claim the foregoing as my invention I have signed my name in presence of two subscribing witnesses.

F. WARNER JONES.

Witnesses:
J. WALTER W. MATHEW,
    *Solicitor, Exeter.*
A. H. WEEKS,
    *His Clerk.*